US009372864B2

(12) United States Patent
Huang et al.

(10) Patent No.: US 9,372,864 B2
(45) Date of Patent: Jun. 21, 2016

(54) ONLINE BINDERS

(71) Applicant: Moxtra, Inc., Los Gatos, CA (US)

(72) Inventors: He Huang, San Jose, CA (US); Subrah S. Iyar, Los Gatos, CA (US)

(73) Assignee: MOXTRA, INC., Los Gatos, CA (US)

( * ) Notice: Subject to any disclaimer, the term of this patent is extended or adjusted under 35 U.S.C. 154(b) by 339 days.

(21) Appl. No.: 14/024,562

(22) Filed: Sep. 11, 2013

(65) Prior Publication Data
US 2014/0089415 A1     Mar. 27, 2014

Related U.S. Application Data

(60) Provisional application No. 61/705,039, filed on Sep. 24, 2012, provisional application No. 61/754,827, filed on Jan. 21, 2013, provisional application No. 61/769,072, filed on Feb. 25, 2013, provisional application No. 61/773,338, filed on Mar. 6, 2013.

(51) Int. Cl.
*G06F 15/16* (2006.01)
*G06F 17/30* (2006.01)
*H04L 29/06* (2006.01)
*G06F 3/048* (2013.01)
*H04L 29/08* (2006.01)

(52) U.S. Cl.
CPC .......... *G06F 17/30126* (2013.01); *G06F 3/048* (2013.01); *H04L 65/403* (2013.01); *H04L 67/06* (2013.01)

(58) Field of Classification Search
CPC . H04L 67/06; H04L 65/403; G06F 17/30126; G06F 3/048
See application file for complete search history.

(56) References Cited

U.S. PATENT DOCUMENTS

| 8,554,731 | B2 | 10/2013 | Aguera y Arcas et al. |
| 2005/0076020 | A1 | 4/2005 | Huntley et al. |
| 2007/0022135 | A1 | 1/2007 | Malik et al. |
| 2007/0055596 | A1 | 3/2007 | Yankovich et al. |
| 2007/0079227 | A1 | 4/2007 | Singh et al. |
| 2007/0130177 | A1* | 6/2007 | Schneider ......... G06F 17/30017 |
| 2007/0244987 | A1 | 10/2007 | Pedersen et al. |
| 2009/0150553 | A1 | 6/2009 | Collart et al. |
| 2010/0036967 | A1* | 2/2010 | Caine ................. H04N 7/17318 709/236 |
| 2010/0235366 | A1 | 9/2010 | Andrew et al. |
| 2011/0167331 | A1 | 7/2011 | Altman et al. |
| 2011/0314528 | A1 | 12/2011 | Dolin et al. |
| 2012/0005596 | A1* | 1/2012 | Carlson ................... G06F 9/445 715/751 |
| 2012/0096342 | A1 | 4/2012 | Wang et al. |
| 2012/0317239 | A1 | 12/2012 | Mulder et al. |
| 2014/0019843 | A1 | 1/2014 | Schmidt et al. |

(Continued)

*Primary Examiner* — Jonathan Bui
(74) *Attorney, Agent, or Firm* — Perkins Coie LLP

(57) ABSTRACT

Technology is disclosed for organizing, managing and sharing data files as pages of an online binder ("the technology"). In various embodiments, the technology stores multiple data files received in multiple formats from multiple sources as pages of the online binder. The pages of the online binder are of a common format. The common format allows the pages, that is, the data files corresponding to the pages, to be accessed using a variety of devices regardless of a platform of the devices. The online binder is platform agnostic. The technology provides tools to create notes for the pages of the online binder. The notes can include text annotations, drawings, or audio visual annotations, including a recording of the user actions as presented on the device of the user. The technology provides a collaboration service for sharing the online binder with multiple users asynchronously or in real-time.

17 Claims, 15 Drawing Sheets

(56) References Cited

U.S. PATENT DOCUMENTS

2014/0033058 A1* 1/2014 Perotti ............... G08C 17/00 715/740
2014/0033073 A1* 1/2014 Pegg .................. H04L 65/403 715/753
2015/0293650 A1* 10/2015 Dukhovny ............ G06F 3/0482 715/732

* cited by examiner

ONLINE BINDERS

CROSS-REFERENCE TO RELATED APPLICATION(S)

This application claims the benefit of U.S. Provisional Application Ser. Nos. 61/705,039 titled "On-line Binder Applications" filed Sep. 24, 2012; 61/754,827 titled "On-line Binders" filed Jan. 21, 2013; 61/769,072 titled "Moxtra Note" filed Feb. 25, 2013; and 61/773,338 titled "Binder Architecture", filed Mar. 6, 2013, all of which are incorporated herein by reference for all purposes in their entirety.

TECHNICAL FIELD

The disclosure relates to online file management and collaboration, and more specifically to file management and collaboration using online binder architecture.

BACKGROUND

Current content management services enable users to organize their content such as photos, videos, documents, etc. in cloud storage. The content management services also allow the users to share their content with other users in a variety of ways, including via social networks. However, the content management services typically store and present the content in the format uploaded by the users. For example, Microsoft Word documents are stored and presented in Microsoft Word document format, an mp3 audio file is stored and presented as mp3 audio file. To access this content the other users with whom the content is shared should have specific software, typically corresponding to the format of the file, installed on their devices. This can be a disadvantage since if the users do not have the specific software installed on their devices, they cannot access the content. Further, the potential to share the content with a wider audience is limited.

Though the content management services allow users to share their content with other users, they typically do not provide real-time collaboration services. The users may have to use a separate collaboration service to collaborate on their content with other users. This can be inconvenient especially if the other content management services do not integrate or work well with the real-time collaboration services or can be burdensome if it involves additional effort from the users. Also, with the current real-time collaboration services, the users may typically have to have specific software installed on their devices to be able to use these collaboration services. Further, the specific software required to use these collaboration services may be different for devices running on different platforms. This can be a disadvantage since it requires the users to have the specific software. Also, some of the current real-time collaboration services lack support for various device types such as smart phones, tablet PCs etc. Consequently, the potential to share the content with a wider audience is limited.

SUMMARY

Technology is disclosed for organizing, managing and sharing data files as pages of an online binder ("the technology"). In various embodiments, the technology stores multiple data files that are received in multiple formats from multiple sources as pages of the online binder. The pages of the online binder are of a common format. The common format allows the pages, that is, the data files corresponding to the pages, to be displayed on or accessed using a variety of devices regardless of a platform of the devices. For example, a page of the online binder corresponding to a Microsoft Word document file can be accessed using devices such as a desktop, a laptop, a smart phone, or a tablet PC regardless of the operating system running on these devices, and regardless of whether the devices have Microsoft Word software installed on them. In some embodiments, the online binder and the pages of the online binder can be accessed using a web browser installed on a device.

In various embodiments, the technology provides an annotation service to create annotations on a particular page of the online binder. The annotations can include text annotations and drawings.

In various embodiments, the technology provides a note service that can be used to create a note for providing audio visual annotations for one or more pages of the online binder. In some embodiments, the note can include an audio recording, e.g., voice of a user, describing the pages of the online binder. In some embodiments, the note can include video recordings that may be used to describe one or more pages. In some embodiments, the note can include a recording of the user actions as presented on the device of the user.

In various embodiments, the technology provides a collaboration service that can be used to share the online binder with a plurality of users, asynchronously or in real-time. In a real-time collaboration, the user actions of a presenter as seen on the screen of a device of the presenter, including any audio-video input received/generated at the device of the presenter, can be mirrored on a device of other participants in the real-time collaboration in real-time.

DETAILED DESCRIPTION

Environment for Online Binder Suite

Figure 1:
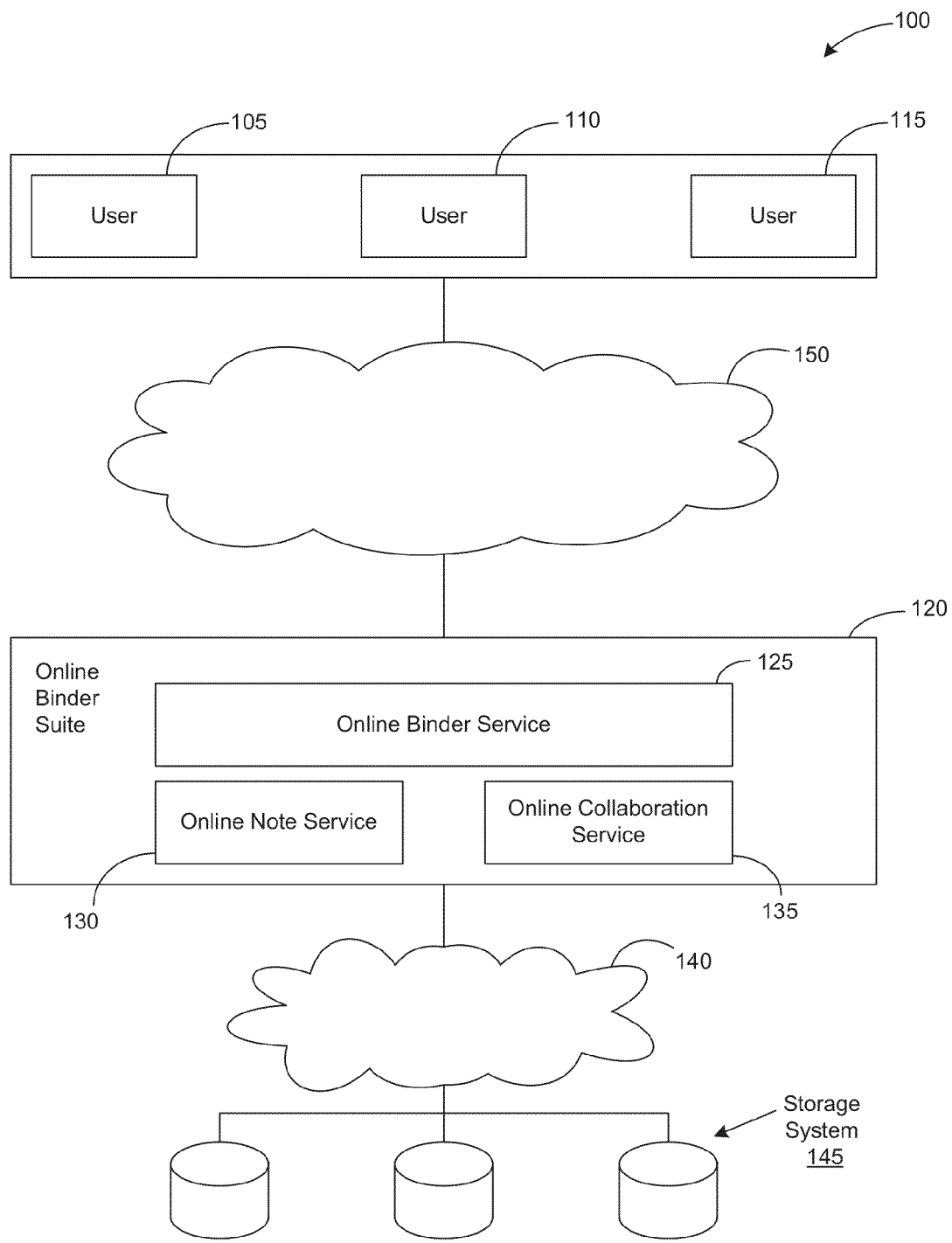
FIG. 1 is a block diagram illustrating an environment in which the technology can operate in various embodiments.

Technology is disclosed for organizing, managing and sharing data files as pages of an online binder ("the technology"). Several embodiments of the described technology are described in more detail in reference to the figures. Turning now to figures, FIG. 1 is a block diagram illustrating an environment 100 in which the technology can operate in various embodiments. The environment 100 includes an online binder suite 120 that provides a set of services such as an online binder service 125, an online note service 130 and an online collaboration service 135 to a set of users, e.g., user 105, user 110 and user 115. The set of users may access the online binder suite 120 via a communication network 150. Further, the set of users may access the online binder suite 120 using a variety of devices, including a desktop, a laptop, a smart phone, or a tablet PC.

In various embodiments, the online binder service 125 presents data files of multiple formats as pages of an online binder. The pages of the online binder are of a common format. The common format allows the pages, that is, the data files corresponding to the pages, to be displayed on or accessed using a variety of devices regardless of a platform of the devices. For example, a page of the online binder corresponding to a Microsoft Word document file can be accessed using a variety of devices regardless of the operating system running on the devices, and regardless of whether the devices have Microsoft Word software installed on them. In some embodiments, the online binder and the pages of the online binder can be accessed using a web browser installed on a device. Further details regarding creating, managing and presenting an online binder are described with reference to at least FIGS. 2-5 and 12.

In various embodiments, the common format can include Scalable Vector Graphics (SVG) format. The SVG format is an XML-based vector image format for two-dimensional graphics that has support for interactivity and animation. The SVG specification is an open standard developed by the World Wide Web Consortium (W3C) since 1999. The SVG images and their behaviors are defined in XML text files. They can be searched, indexed, scripted, and compressed. Further, as XML files, SVG images can be created and edited with any text editor. The SVG format also includes variants, e.g., mobile profiles, that are used for mobile devices or devices with reduced computational and display capabilities. Though SVG is suitable for being used as a common format, the common format is not limited to SVG.

Referring back to FIG. 1, the online note service 130 allows the users to create a note for providing audio-visual annotations for one or more pages of the online binder. In some embodiments, the note can include an audio recording describing the pages of the online binder. For example, an audio annotation can describe aspects of a new sales proposal. In some embodiments, the note can include video recordings that may be used to describe one or more pages. An example of the video recording annotation can include a video of a house a realtor is discussing about in a page. In some embodiments, the note can include a recording of the user actions as presented on the device of the user. For example, the user actions can include user actions involved in the process of describing a presentation created using the online binder. The recording can include user actions such as the movements of the cursor of a pointing device, the menu option clicked, the audio of the user, navigation between the pages etc. In various embodiments, the online note service 130 also provides an annotation service to create annotations such as text annotations and drawings, on a particular page of the online binder. Further details regarding the online note service 130 are described with reference to at least FIGS. 6-8 and 13.

Referring back to FIG. 1, the online collaboration service 135 allows the users, such as users 105, 110 and 115 to collaborate on an online binder. The users may collaborate asynchronously or in real-time. In a real-time collaboration, the user actions of a presenter as seen on the screen of a device of the presenter, including any audio-video input received/generated at the device of the presenter, can be mirrored on a device of other participants in the real-time. The presenter can invite other participants to the real-time collaboration via email, text message, notifications via the online collaboration service 135, social networking etc. A user may share his/her online binder asynchronously with other users which allows them to view, create, modify or delete the online binder. Further details regarding the online collaboration service 135 are described with reference to at least FIGS. 9, 10 and 14.

Referring back to FIG. 1, in various embodiments, the online binders may not be configured to be stored on a local device of the user. The online binders are configured to be stored in an online storage system such as storage system 145. The storage system 145 stores online binders, pages of the online binder, notes, data files that are uploaded by the users etc. The storage system 145 can include a set of databases. In various embodiments, the storage system 145 may be configured as a cloud storage system that can be distributed among different geographical locations. The pages associated with a particular online binder can be stored in the same database of the storage system 145 or different databases of the storage system 145. Further, the storage system 145 may be set up separate from the online binder suite 120, for example, on different machines, different geographical locations etc. The online binder suite 120 can access the storage system 145 via a communication network 140.

The online binder suite 120 may be implemented in a variety of configurations. One typical configuration can include an online configuration in which the online binder suite 120 is implemented as a distributed system in a network, for example, LAN, WAN, or Internet. The users access the online binder suite 120 over a communication network such as network 150. In various embodiments, the online binder suite 120 may also be implemented in server client configuration in which an application corresponding to the client portion may be installed on the device of the user. The users can access the online binder suite 120 using a web browser or an online binder suite application (also referred to as "online binder app" or "app") installed on the device of the user.

Online Binder Service

Figure 2:
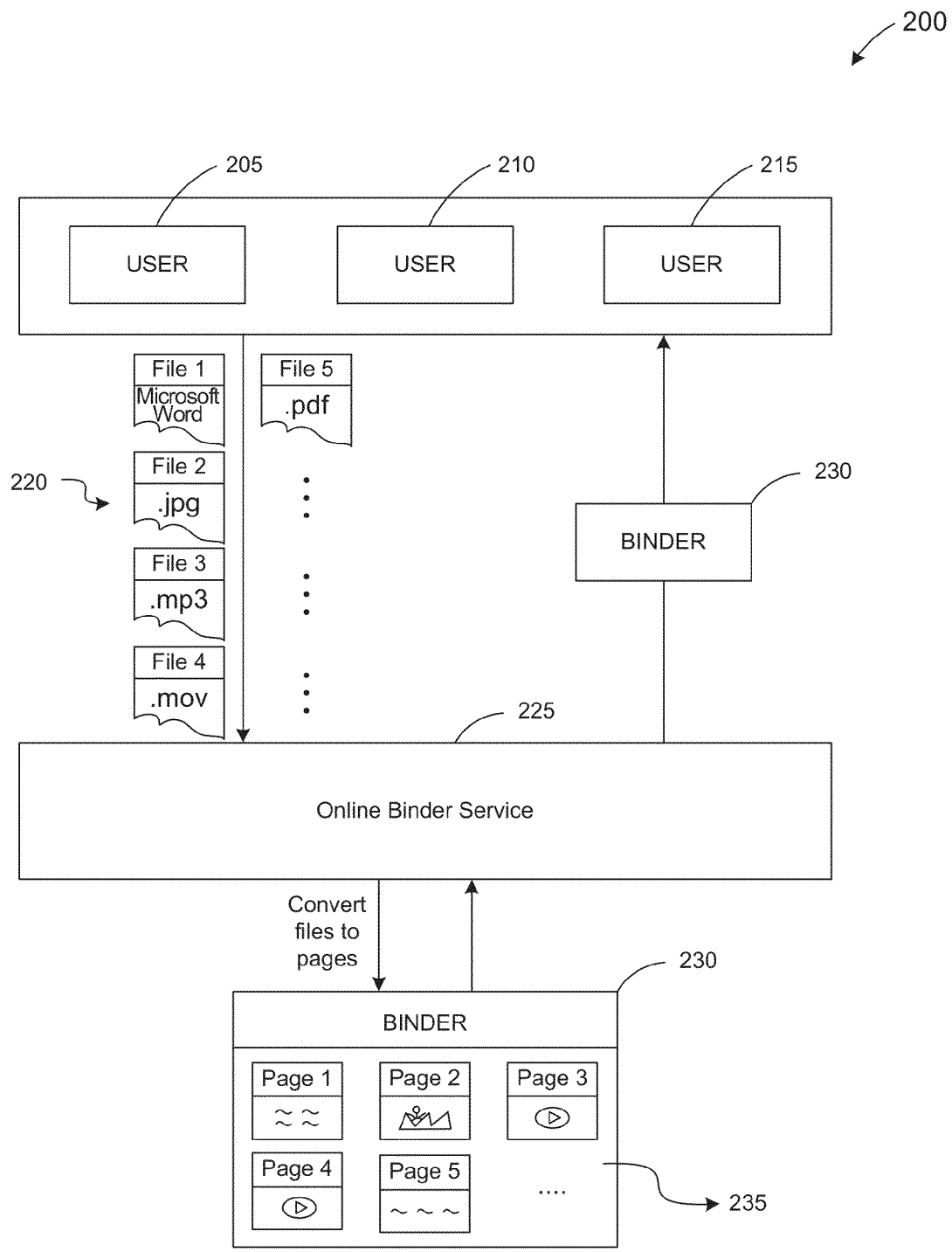
FIG. 2 is a block diagram illustrating an environment for managing an online binder using an online binder service of FIG. 1, consistent with various embodiments.

Turning now to FIG. 2, FIG. 2 is a block diagram illustrating an environment 200 for managing an online binder using an online binder service of FIG. 1, consistent with various embodiments. The online binder service 225 of the environment 200 can be similar to the online binder service 125 of FIG. 1.

Users such as user 205, user 210 and user 215 can upload multiple files 220 in multiple formats to a particular online binder. The formats can include, for example, (a) Microsoft Word format, (b) Microsoft Excel format, (c) Microsoft PowerPoint format, (d) Joint Photographic Experts Group (.jpg)

format, (e) Adobe portable document format (.pdf), (f) Apple QuickTime format (.mov), (g) Apple Keynotes format, (h) Graphics interchange format (.gif), (i) bitmap format (.bmp), and (j) Microsoft Text (.txt) format. The online binder service 225 converts the multiple files of multiple formats to corresponding pages 235 of a common format, and associates the pages 235 with an online binder of the user, such as online binder 230. Upon access, the online binder service 225 presents the data files 220 as pages 235 of the online binder 230 to the users. In some embodiments, the online binder suite 225 can also be configured to store a copy of the data files as received by the users, for example, in their original format. For example, a Microsoft Word document can be stored as a Microsoft Word document file.

As described above, the common format allows the users to access the pages 235 (that is, the data files corresponding to the pages 235) from a device regardless of whether the device has a corresponding software required to access a data file of a particular format. The pages 235 can be accessed using a variety of devices, including a desktop, a laptop, a smart phone, or a tablet PC. The pages 235 may be accessed using a web browser installed on the device. In some embodiments, the web browser can include a script for rendering the pages 235 on the device. Further, the online binder 230 is platform agnostic, that is, the users may access the pages 235 from a device regardless of the operating system of the device. For example, the users may access the online binder 230 from devices running on operating systems such as Microsoft Windows, Mac OS, iOS, Google Chrome, and Android.

The online binder service 225 facilitates the users to upload the data files 220 to the online binder 230 from multiple sources and in multiple ways. For example, a user 205 may upload the data files 220 from a device of the user 205. The user 205 may capture a portion of content displayed on the device, for example, using a snapshot tool provided by the online binder service 225 and upload the snapshot to the online binder 230. The user 205 may upload the data files 220 to the online binder 230 via an electronic-mail. The user 205 may upload the data files 220 to the online binder 230 from a storage service, such as Dropbox, subscribed to by the user. The user 205 may upload the data files 220 located on a remote device of the user from the device of the user 205. In various embodiments, the online binder service 225 facilitates the user 205 to access the remote device via an online binder remote desktop application (also referred to as "remote application") installed on the remote device. The remote application is an application associated with the online binder suite 120 of FIG. 1 that allows the user to access a remote device on which the remote application is installed from another device of the user and upload the files from the remote device to the online binder 230.

The user 205 may create more than one online binder and associate a page with more than one online binder. Further, multiple users may upload files to the same online binder 230, provided they have "write access" to the online binder 230 which can be obtained from an owner of the online binder 230.

Figure 3:
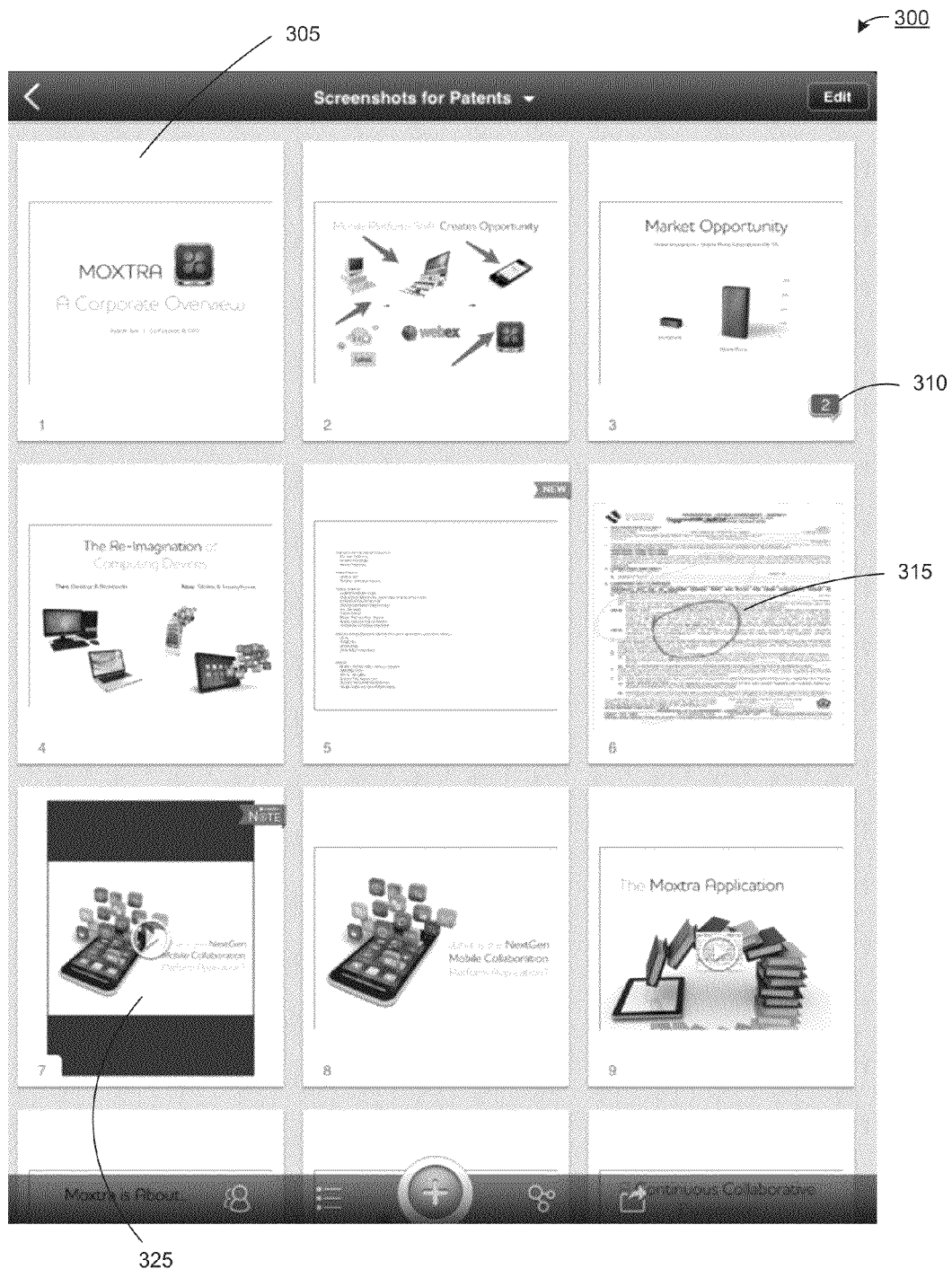
FIG. 3 is an example of an online binder, consistent with various embodiments.

Turning now to FIG. 3, FIG. 3 is an example of an online binder, consistent with various embodiments. The online binder 300 can be similar to the online binder 230 of FIG. 2. The online binder 300 includes several pages such as page 305. The user may open a page by, for example, clicking on the page. The pages correspond to various data files, which can be of multiple formats, uploaded by a user such as user 205. For example, page "1" can correspond to a Microsoft Powerpoint file uploaded by the user 205; page "2" can correspond to an .jpg file; page "5" can correspond to a Microsoft Word file; page "6" can correspond to a Adobe PDF file.

The online binder suite 120 of FIG. 1 also allows an user to create a page from within the online binder 300. For example, page "7" of the online binder 300 is an online note page created by the user using online note service 130. The online note is described in further detail with reference to at least FIGS. 6-8 and 13.

Figure 4:
FIG. 4 is an example of an annotated page of the online binder of FIG. 3, consistent with various embodiments.

The online binder suite 120 provides an annotation service that can be used to create annotations such as textual annotations, drawings, etc. For example, page "6" of the online binder 300 includes an annotation such as a drawing or a mark 315 made by the user on the page. Page 400 of FIG. 4 is another example of an annotated page of the online binder 300. The user can annotate the page with text and drawings such as annotation 405. The user may also annotate the page with other drawings such as an arrow 410. In various embodiments, the annotations 405 and 410 can be made using a drawing tool 415.

Figure 5:
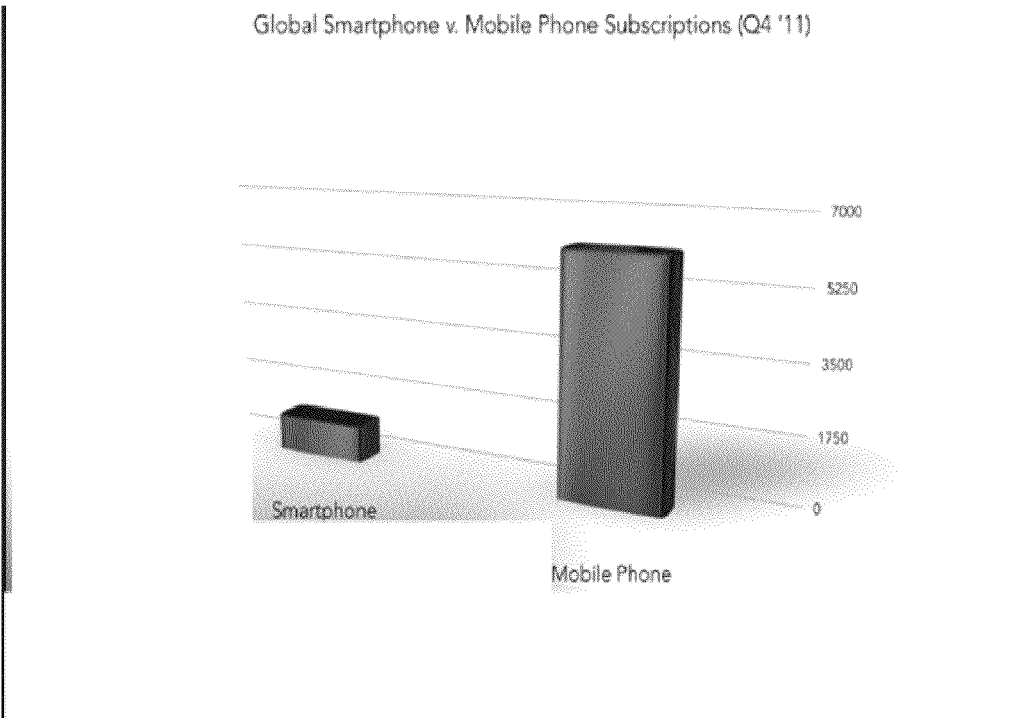
FIG. 5 is an example of a page of the online binder of FIG. 3 with comments from users, consistent with various embodiments.
Figure 5:
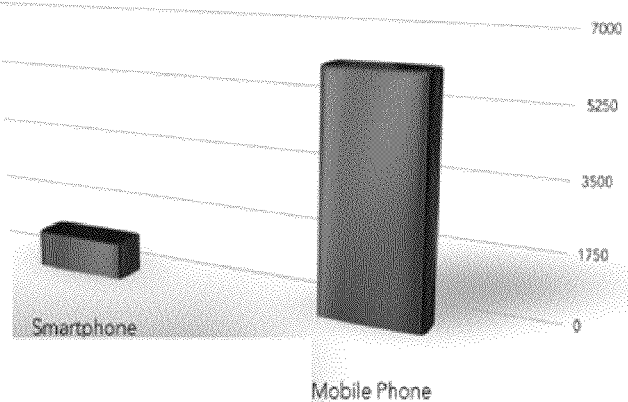
Figure 5:
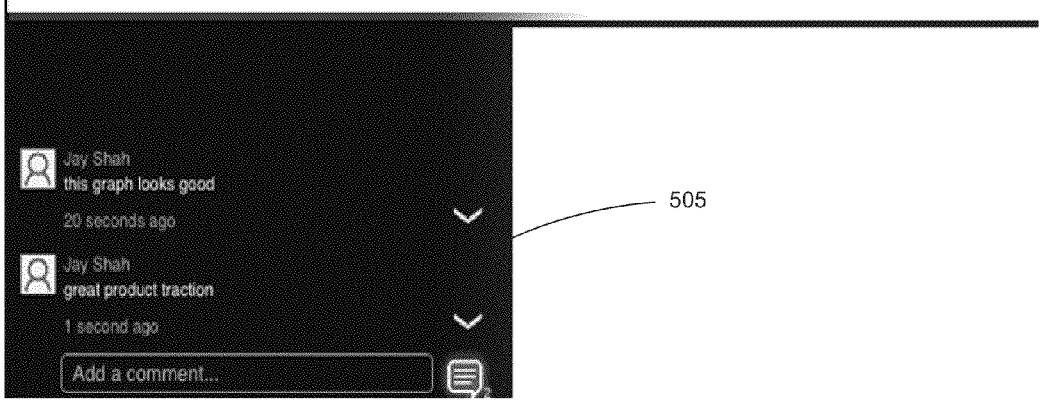

Referring back to FIG. 3, as described earlier, the online binder 300 may be shared between users. An online binder has an associated owner who is a user that has the rights to create, modify, delete or share the binder. The owner can share the online binder with various users at various degrees. For example, the owner can permit certain users to (a) view the online binder, (b) modify, that is, view or modify the pages, (c) add or delete pages, (d) make annotations to the pages, and (e) make comments on the pages. Any changes made to a page or an online binder by the users who have write privileges (create, modify, add, or delete) are tracked and recorded. The users may view the log of changes made to the page or the online binder. FIG. 5 illustrates a page 500 having comments 505 from users. The page 500 is an example of a page, such as page "3" of the online binder 300.

Referring back to FIG. 3, in various embodiments, a symbol such as comment symbol 310 is displayed in association with the page as shown in FIG. 3 to indicate that the page has comments. Further, in various embodiments, the comment symbol 310 can also display the number of comments on the page.

Still referring to FIG. 3, users can collaborate on the online binder 300 by sharing the online binder 300 either asynchronously or in real-time. Real-time collaboration is described at least with reference to FIGS. 9, 10 and 14. The owner can invite other users to collaborate on the online binder 300 in a variety of ways. For example, the owner can send an invitation to the users by email, mobile phone text messages, notifications via the online binder app, and notifications via a social network such as Facebook and Twitter. In various embodiments, the invitation can have a link (a uniform resource locator (URL)) to the online binder 300.

In various embodiments, any changes to made to a page of an online binder from a device which is offline are synchronized back with the online binder in the storage system 145 when the device is back up online. A device can be considered to be "offline" when, for example, the online binder suite 120 and/or storage system 145 are not accessible by the device. When a user accesses the page of an online binder, a portion of the page or a portion of the online binder is stored on a cache of the user device. The changes made to the page while the device is offline are recorded in the cache, and are synchronized with the online binder when the device goes back up online. This way, even if the device goes offline (due to reasons such as poor Internet connectivity) while the changes are being made, the changes are not lost.

In some embodiments, any changes made to a page by online users while a particular user is offline and working on an offline copy of the page, is combined with the changes made by the offline user when the device of the offline user goes back online. The combinded changes are then synchronized to the page in the online binder and all the users would then view the page updated based on the combined changes.

Online Note Service

Figure 6:
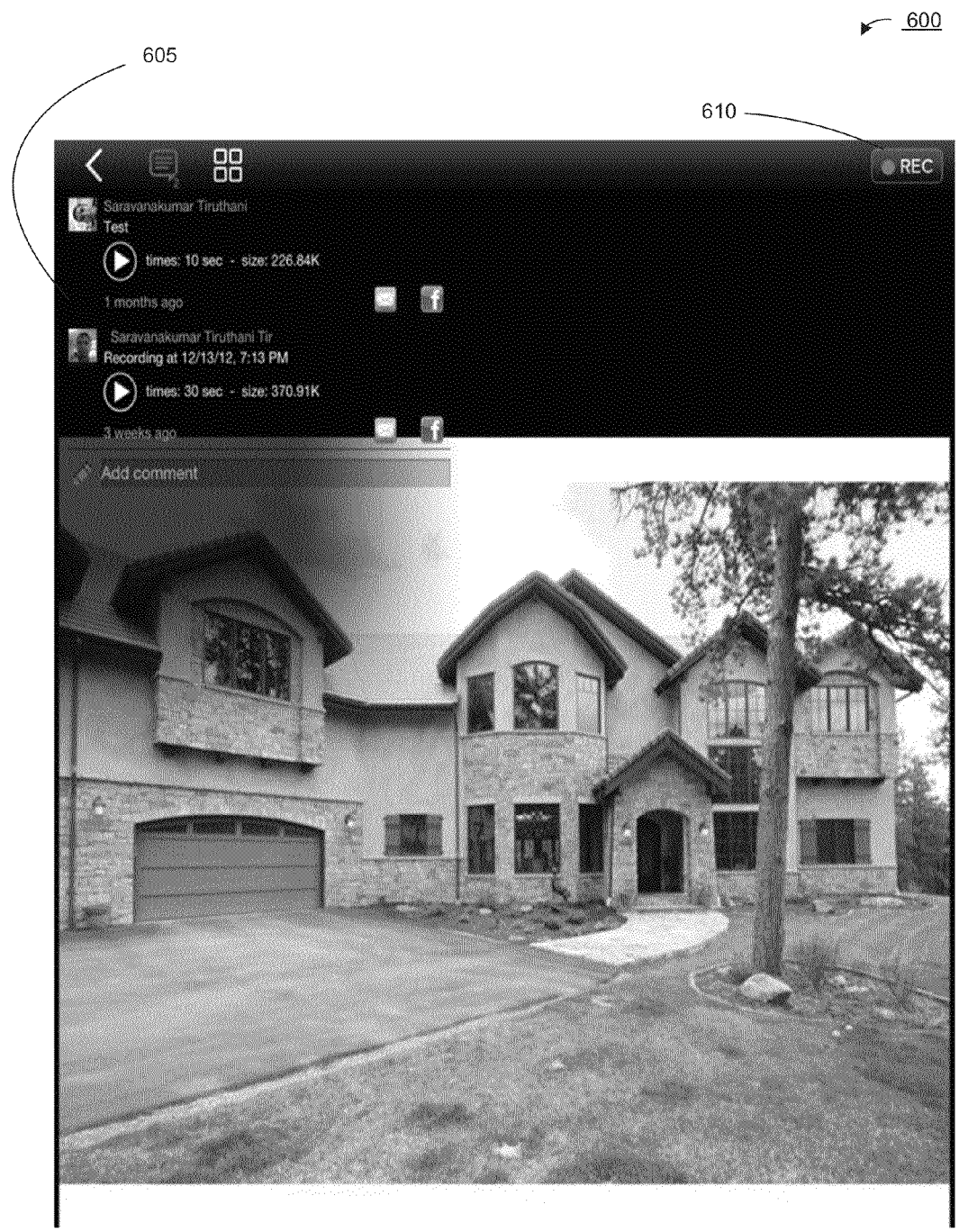
FIG. 6 is another example of a page of the online binder of FIG. 3 with audio annotations from the users, consistent with various embodiments.

Referring back to FIG. 1, the online binder suite 120 includes an online note service 130 that facilitates creating a note such as audio-visual annotations, a recording of user actions associated with annotating a page etc. The audio annotation can include, for example, an oral description of the contents of a page by one or more of the users. FIG. 6 is an example of a page 600 including audio annotations from the users, consistent with various embodiments. The page 600 can have several notes such as audio annotations 605 from one or more users. In various embodiments, a list of the audio annotations 605 may be displayed to the users as shown in page 600. Further, the audio annotations may be created using a recording tool 610 of the online note service 130. In various embodiments, a symbol such as playback symbol 320 on page "9" of the online binder 300 of FIG. 3 indicates that the page includes a note.

Figure 7:
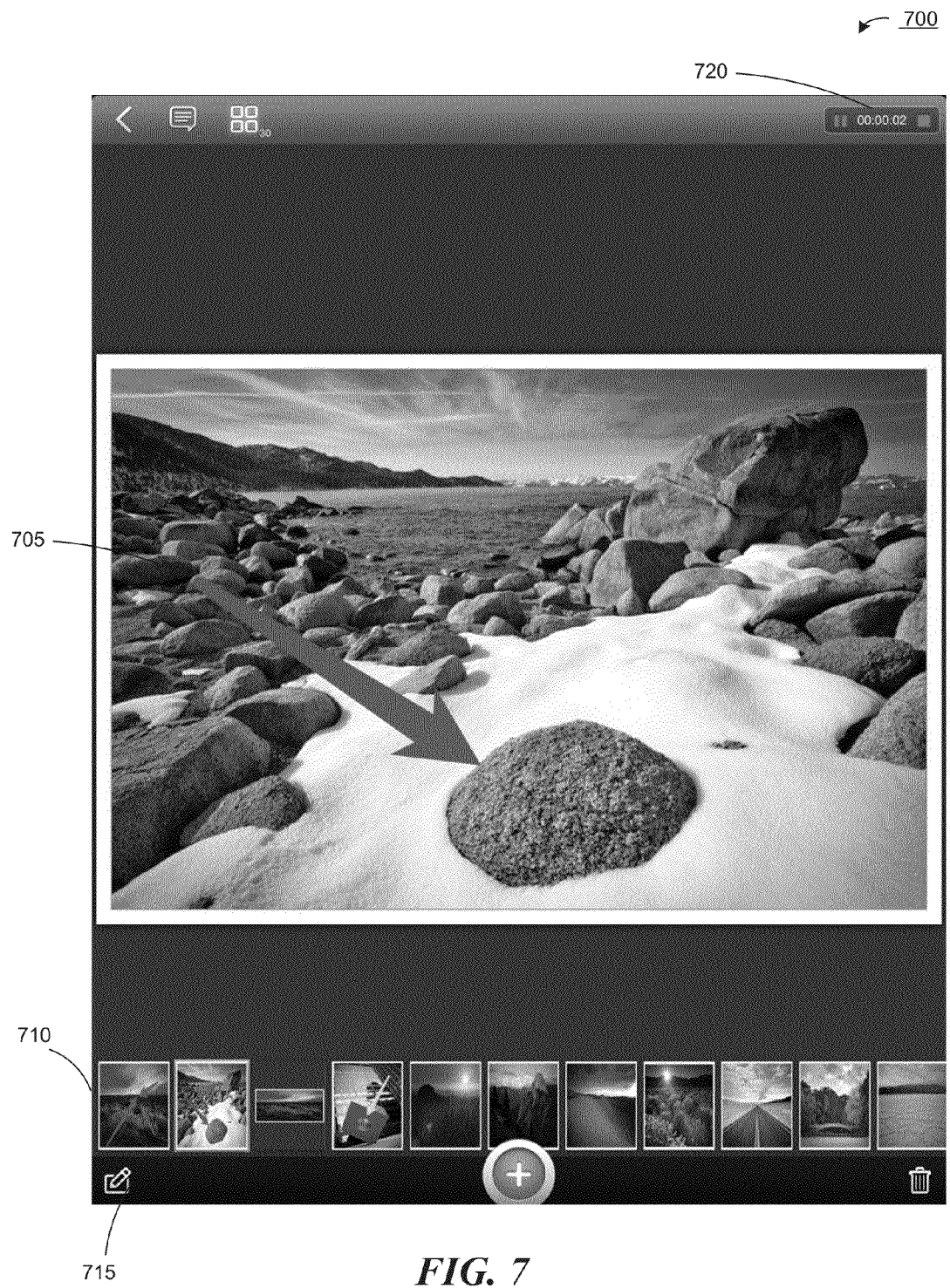
FIG. 7 is an example of creating an audio-visual note for a page of the online binder, consistent with various embodiments.

The audio-visual annotations can include a recording of annotating the page as the users are annotating the page. That is, the online note service 130 records user actions involved in annotating the page, such as drawing a line, typing a text, drawing an arrow (which can be a simulation of pointing a laser pointer to a particular portion of the page), zooming in to/out from a specific portion of the page, navigating to another page, moving the cursor of a pointing device, selection of a page, etc. as the user is performing the actions. FIG. 7 is an example of creating an audio-visual note for a page of the online binder, consistent with various embodiments. Consider an example where a user intends to describe an interesting piece of rock the user came across in a recent travel. As shown in page 700, the user can create an audio-visual note describing the rock. The user can record his actions of the drawing the arrow 705 and his voice describing the rock. The user can also create a video recording of him describing the rock, etc. In this way, the user can draw the attention of viewers to a specific aspect of the page. Further, during the recording, the user can also refer to or navigate to other pages 710 to describe the rest of his trip. The user may draw or type text on one or more of the other pages 710 similarly. All the user actions as presented on the screen of the device during the recording will be recorded by the online note service 130.

Figure 8:
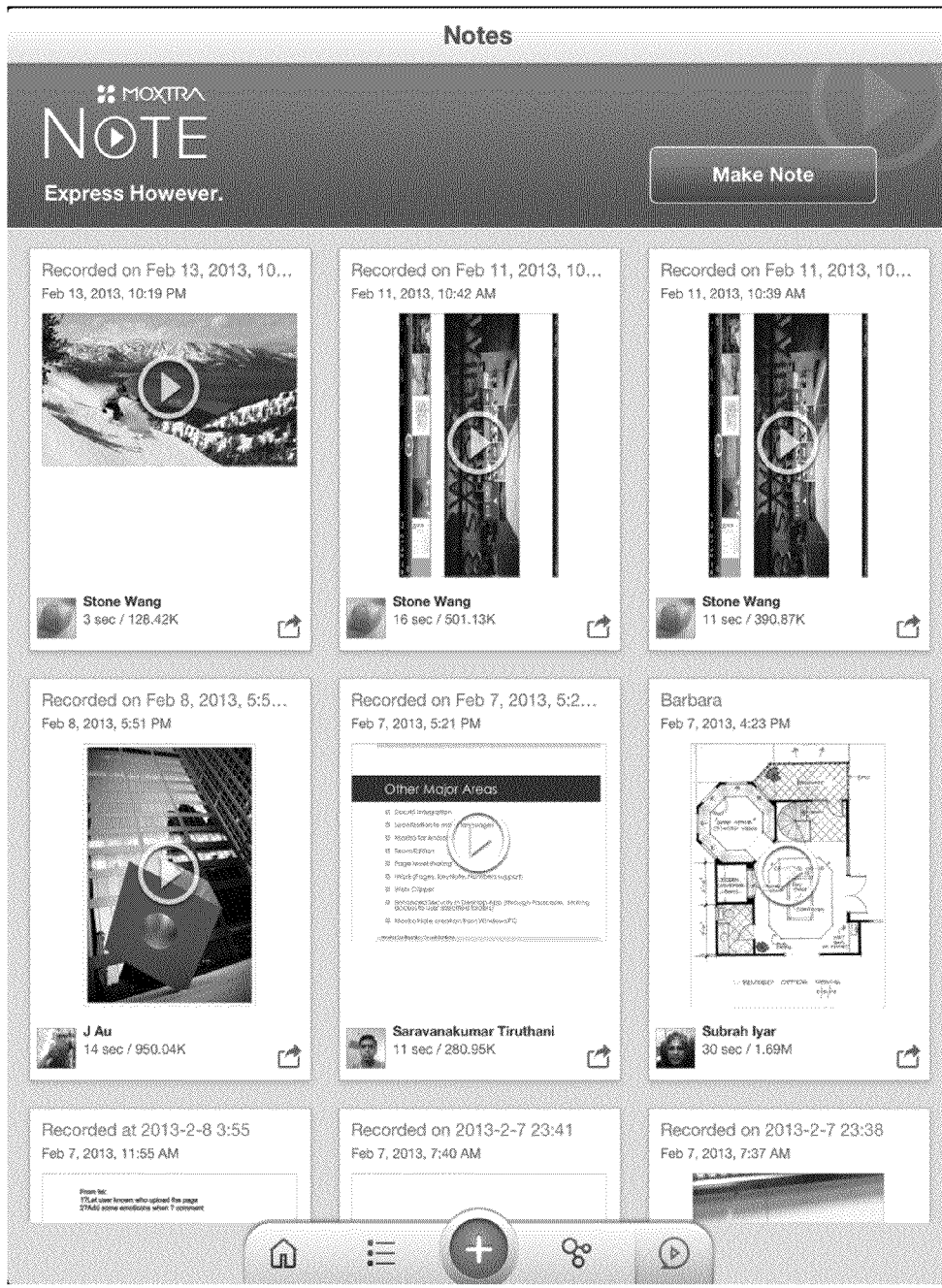
FIG. 8 is an example of a note binder containing notes created by a user, consistent with various embodiments.

In various embodiments, the user can create the annotations using a tool such as the annotation tool 715. The recording can be controlled, for example, started, stopped, paused, using a tool such as record tool 720. The recording can be stored as a note. The note can be stored as a separate page in an online binder or in association with a page for which the note is created. In some embodiments, the note is stored as a separate page in the same online binder which contains pages on which the note is created. FIG. 3 shows an example where a note 325 created to describe pages of the online binder 300 is stored in the online binder 300. Additionally or alternatively, the note can be stored in a separate note binder 800, as shown in FIG. 8, which is configured to store only notes. FIG. 3 shows an example where a note is stored in association with the page "9" of the online binder 300. As described earlier, the playback symbol 320 on the page "9" indicates that the page is associated with a note.

When a user accesses the note, for example, by accessing the page such as note 325, the playback symbol 320 or a page from the note binder 800, the corresponding recording is played back to the user. If the note is an audio annotation, the audio is played back to the user. On the other hand, if the note is an audio-visual annotation, the audio-visual annotation, including the user actions involved in creating the audio-visual annotation by a note author is played back to the user. For example, when the above mentioned note describing the user's travel experience is played back, all the user actions such as drawing the arrow, navigating to other pages, user's audio annotation etc. are played back to the viewer in the same sequence as created by the note author.

Similar to the online binder, notes may also be shared between the users. For example, a note author can invite users to access a note by sending them an invitation. In various embodiments, the invitation can have a link (a uniform resource locator (URL)) to the note. The invitations may be sent by various means including email, mobile phone text messages, notifications via the online binder app, and notifications via a social network such as Facebook and Twitter. In some embodiments, the notes can be shared independent of the online binder which the note is associated with. That is, a user may share the note regardless of whether the online binder which contains the note is shared with the other users, and the invitees can access the shared notes regardless whether they have permission to access the online binder. In some embodiments, the notes can be uploaded to third party services such as YouTube.

Online Collaboration Service

Figure 9:
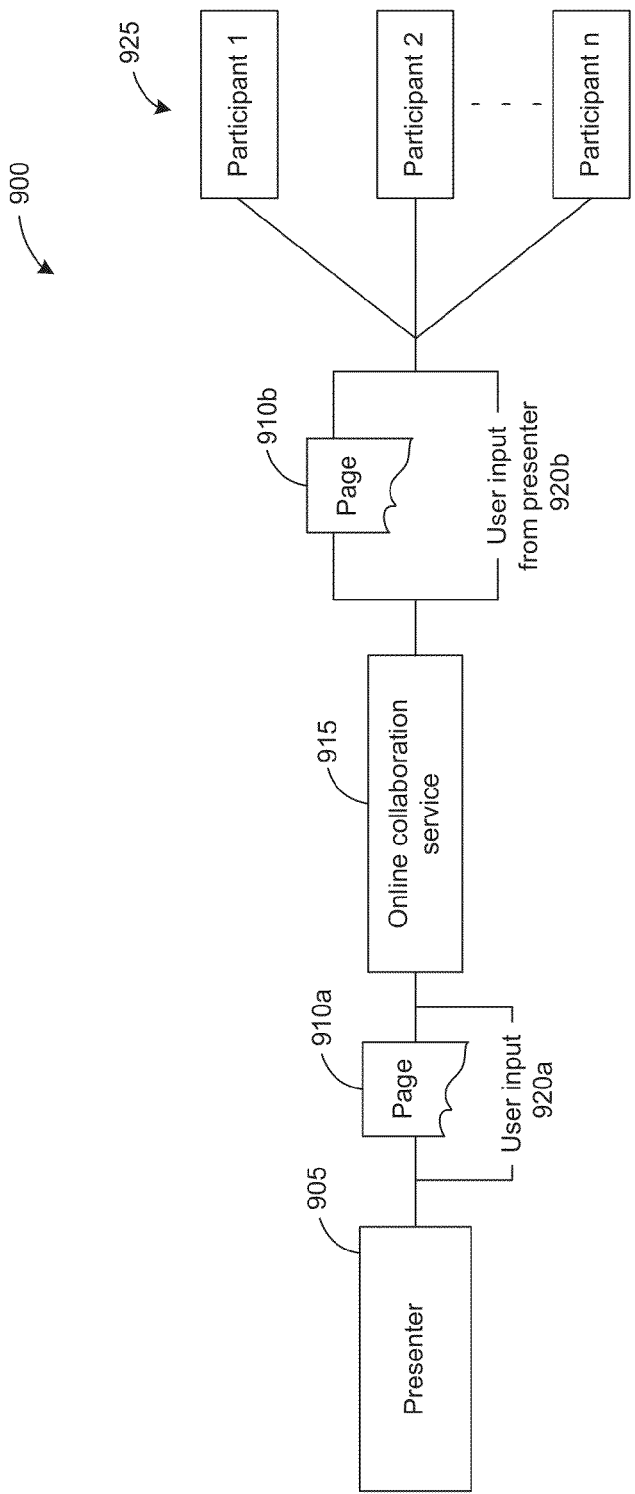
FIG. 9 is a block diagram illustrating a system for real-time online collaboration on an online binder, consistent with various embodiments.

FIG. 9 is a block diagram illustrating a system 900 for real-time online collaboration between users on an online binder, consistent with various embodiments. The system 900 includes an online collaboration service 915 that facilitates real-time collaboration on a page 910a of an online binder between a user such as a presenter 905 and users such as participants 925. In various embodiments, the online collaboration service 915 can be similar to the online collaboration service 135 of FIG. 1 and the page 910a can be similar to one of the pages of the online binder 300 of FIG. 3.

The presenter 905 can invite the participants 925 to join a real-time online collaboration session (also referred to as "real-time meeting") by sending an invitation to the participants 925. In various embodiments, the invitation can have a link (a uniform resource locator (URL)) to the real-time meeting including a meeting identification (ID). The invitations may be sent by various means including email, mobile phone text messages, notifications via the online binder app, and notifications via a social network such as Facebook and Twitter. Additionally or alternatively, a participant may request to join a particular real-time meeting. The participant may select a real-time meeting from the list of real-time meetings that are in progress and request access to attend the meeting. The presenter 905 may accept or reject the requests from the participants 925.

In various embodiments, an online session for the real-time meeting may start when there is at least one participant present in the real-time meeting in addition to the presenter 905. The online collaboration service 915 captures the page 910a and user input 920a associated with the page 910a, from the presenter 905 and transmits them to the participants 925 as page 910b and user input 920b, respectively, in real-time. The participants 925 can then view the page 910b including the user actions on the page 910a performed by the presenter 905, on the screen of their respective devices, and can also hear the audio from the presenter 905 in real-time. The user input 920a can include user actions such as drawing a line, typing a text, drawing an arrow, zooming in to/out from a specific portion of the page, navigating to another page, moving the cursor of a pointing device, selecting of a page, launching an application, audio-video input, etc.

In the real-time meeting, the audio input from the presenter 905 (e.g., voice of the presenter 905) and the screen of device of the presenter 905 are mirrored on the devices of the participants 925 in real-time. That is, the participants 925 can view on their devices, the user actions of the presenter 905 and contents of the screen as seen on the device of the presenter 905. Additionally, any other user input from the presenter 905 such as audio-video input is also received by the participants 925 in real-time.

The presenter 905 may also let one or more of the participants 925 assume the role of a presenter. That is, the one or more of participants 925 may also talk and perform user actions on the page and be heard in the real-time meeting. That is, the user actions of the one or more participants 925, including the audio input, is transmitted to the presenter 905 and the remaining participants in real-time.

Figure 10:
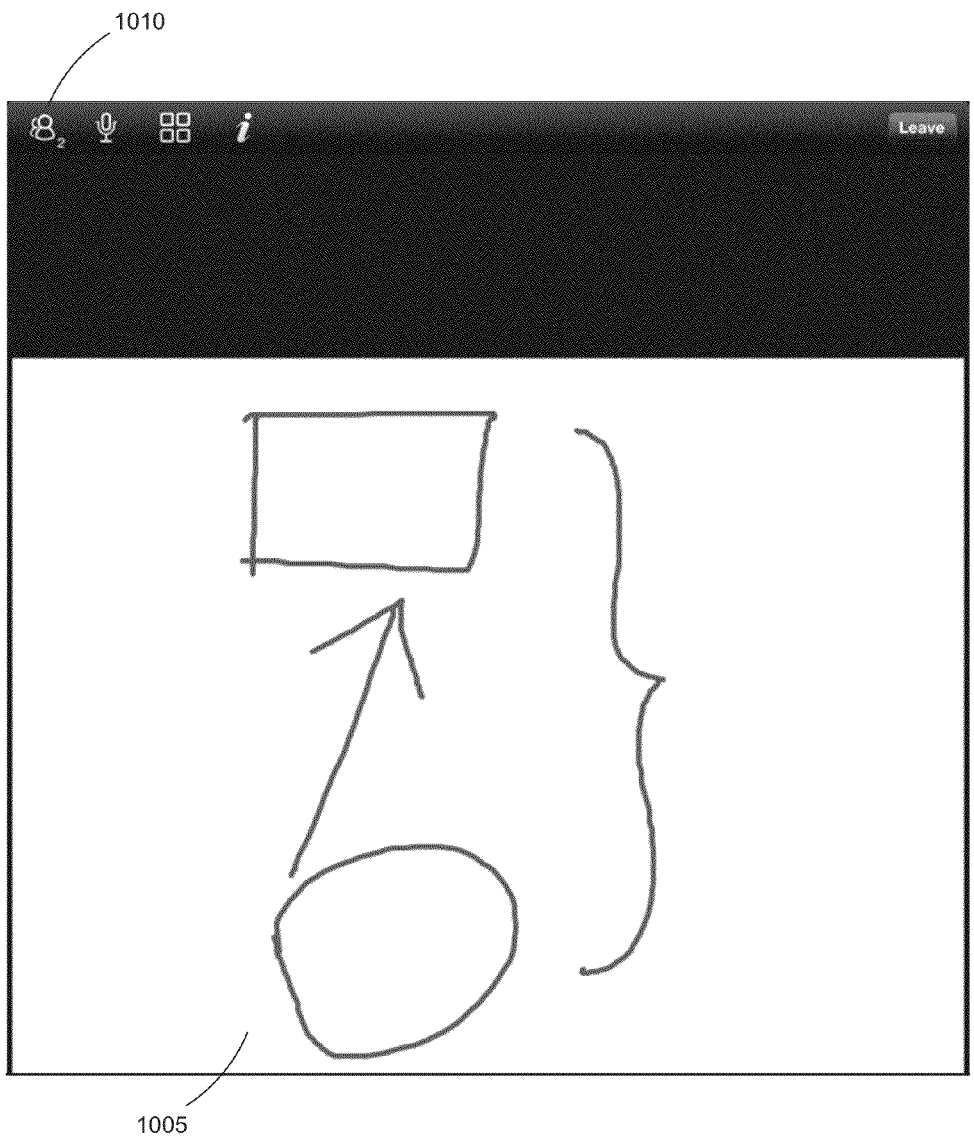
FIG. 10 is an example of real-time online collaboration on a page of an online binder, consistent with various embodiments.

FIG. 10 is an example 1000 of real-time online collaboration between users on a page of an online binder, consistent with various embodiments. Consider a real-time meeting where a page such as a whiteboard page 1005 is shared between two users, one of which is a presenter and another is a participant. Consider that the presenter is creating a freehand drawing on the whiteboard page 1005 and simultaneously talking while drawing. During the real-time meeting, the whiteboard page 1005 and the user actions of the presenter on the whiteboard page 1005 are transmitted to the participant in real-time. Consequently, the participant can view, in real-time, the whiteboard page 1005 on the screen of a device of the participant, the drawing as the presenter is drawing, and also hear, in real-time, the presenter's voice.

In various embodiments, the online collaboration service also indicates the number of users present in a real-time meeting. In the example 1000, an indicator 1010 indicates the number of participants in the real-time meeting described above.

In various embodiments, the online collaboration service also provides a facility to record the real-time meeting. The recording of the real-time meeting may be stored as a page in an online binder and may also be shared with other users. The user may view a history of the recordings, search for specific recordings, search within a recording, go to a specific page in the recording using the online collaboration service. In various embodiments, the users may access the online collaboration service via a web browser or the online binder app installed on the device of the user.

The presenter 905 may also share the page 910a asynchronously with the participants. The presenter 905 can set appropriate privileges (described above) for the participants to access the online binder or pages of the online binder and invite them to access the online binder.

Figure 11:
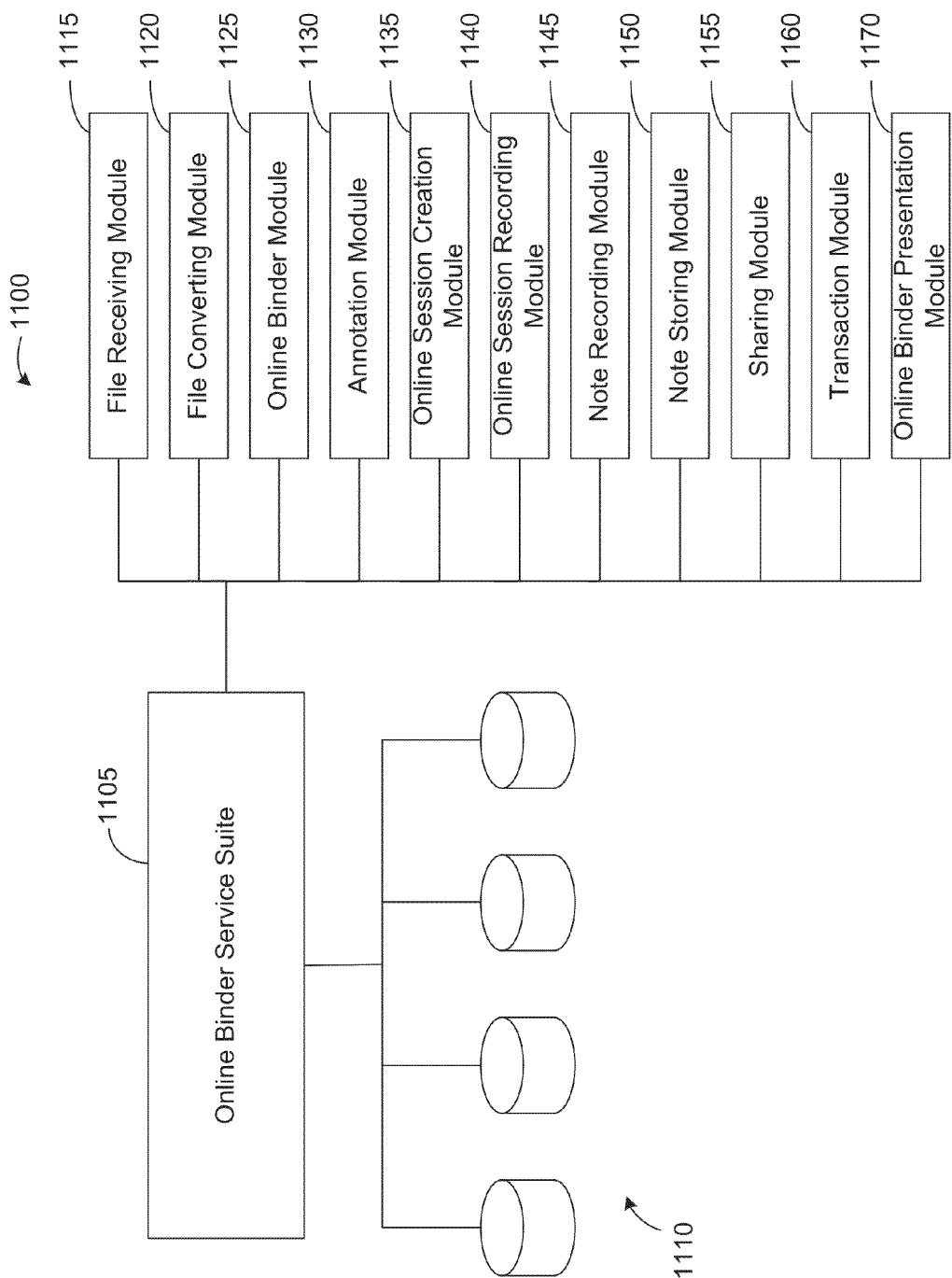
FIG. 11 is a block diagram of a system for an online binder suite of FIG. 1, consistent with various embodiments.

FIG. 11 is a block diagram of a system 1100 for an online binder suite of FIG. 1, consistent with various embodiments. In various embodiments, the system 1100 is implemented to perform functions such as the functions of environment 100. In various embodiments, the online binder suite 1105 can be similar to the online binder suite 125. The online binder suite 1105 includes various modules that provide services including managing data files of multiple formats as pages of an online binder, creating a note for providing audio-visual annotations for one or more pages of the online binder, and collaborating on the online binder asynchronously or in real-time.

The online binder suite 1105 includes a file receiving module 1115 that receives data files from the users. In some embodiments, the data files can be in multiple formats. The file converting module 1120 converts the received data files to pages of an online binder. The pages of the online binder are of a commont format. The online binder module 1125 stores the pages in a storage system 1110 and associates the pages with one or more online binders. In various embodiments, the storage system 1110 can be similar to the storage system 140 of FIG. 1. The online binder presentation module 1170 presents the online binder and the pages to the users. The annotation module 1130 facilitates the user to create annotations for a page. The annotations can include textual annotations, or drawings.

The online session creation module 1135 initiates an online session for a real-time meeting between a presenter and participants for an online binder. In various embodiments, the online binder presentation module 1170 presents a page of the online binder to the presenter, receives the user actions from the presenter, and then presents the page, including the user actions of the presenter to the participants. The online session recording module 1140 facilitates recording of the real-time meeting between the presenters and the participants.

The note recording module 1145 facilitates the user to create notes, including audio-visual annotations, for pages of the online binder. The note storing module 1150 facilitates storing the notes as pages in online binder or in association with the pages for which the note is created. The sharing module 1155 facilitates a user to share entities including online binder, pages, notes, etc. with other users. In various embodiments, the users can share the entities by inviting other users to access them. The transaction module 1160 tracks transactional data related to the changes made to an online binder, page etc. The changes can include any modifications made to the page, notes, etc. In some embodiments, the transactional data can include a username of a user responsible for a modification, a date, or a time at which the modification is made.

Figure 12:
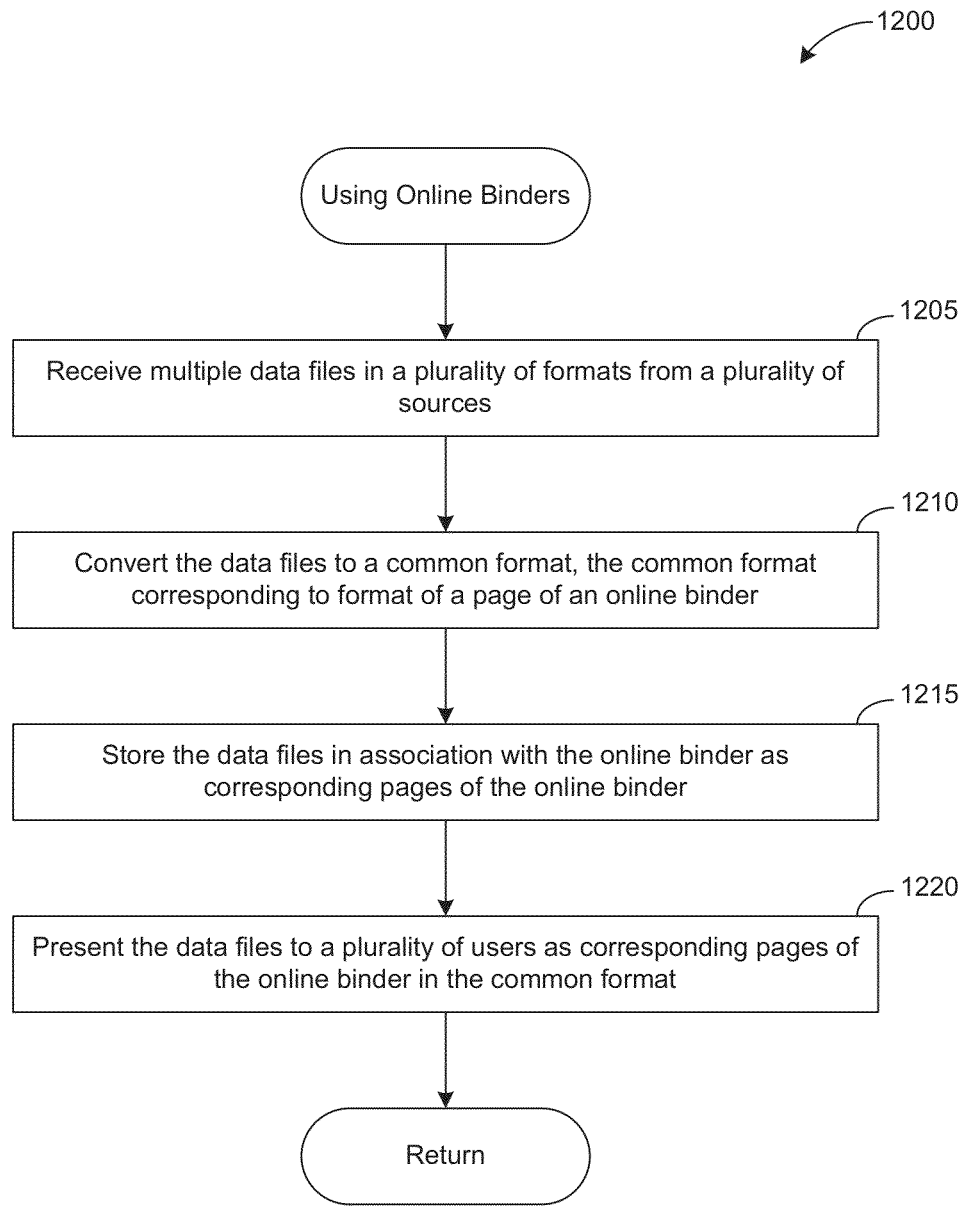
FIG. 12 is a flow diagram of a process of using an online binder, consistent with various embodiments.

FIG. 12 is a flow diagram of a process 1200 of using an online binder, consistent with various embodiments. In some embodiments, the process 1200 may be executed in a system such as system 1100 of FIG. 11. At block 1205, the file receiving module 1115 receives multiple data files in multiple formats from a plurality of sources. At block 1210, the file converting module 1120 converts the data files to a common format. The common format corresponds to format of a page of an online binder.

At block 1215, the online binder module 1125 stores the data files as corresponding pages of the online binder. At block 1220, the online binder presentation module 1170 presents the data files to the user as pages of the online binder in the common format. The common format allows the data files to be accessed by the users from a variety of device regardless of whether a device of the user has a software required for opening the data file of a particular format. Further, the online binder is platform-agnostic. That is, the user can access the pages from a device regardless of the operating system (or platform) of the device. The user may access the online binder using a web browser or the online binder app installed on the device.

Figure 13:
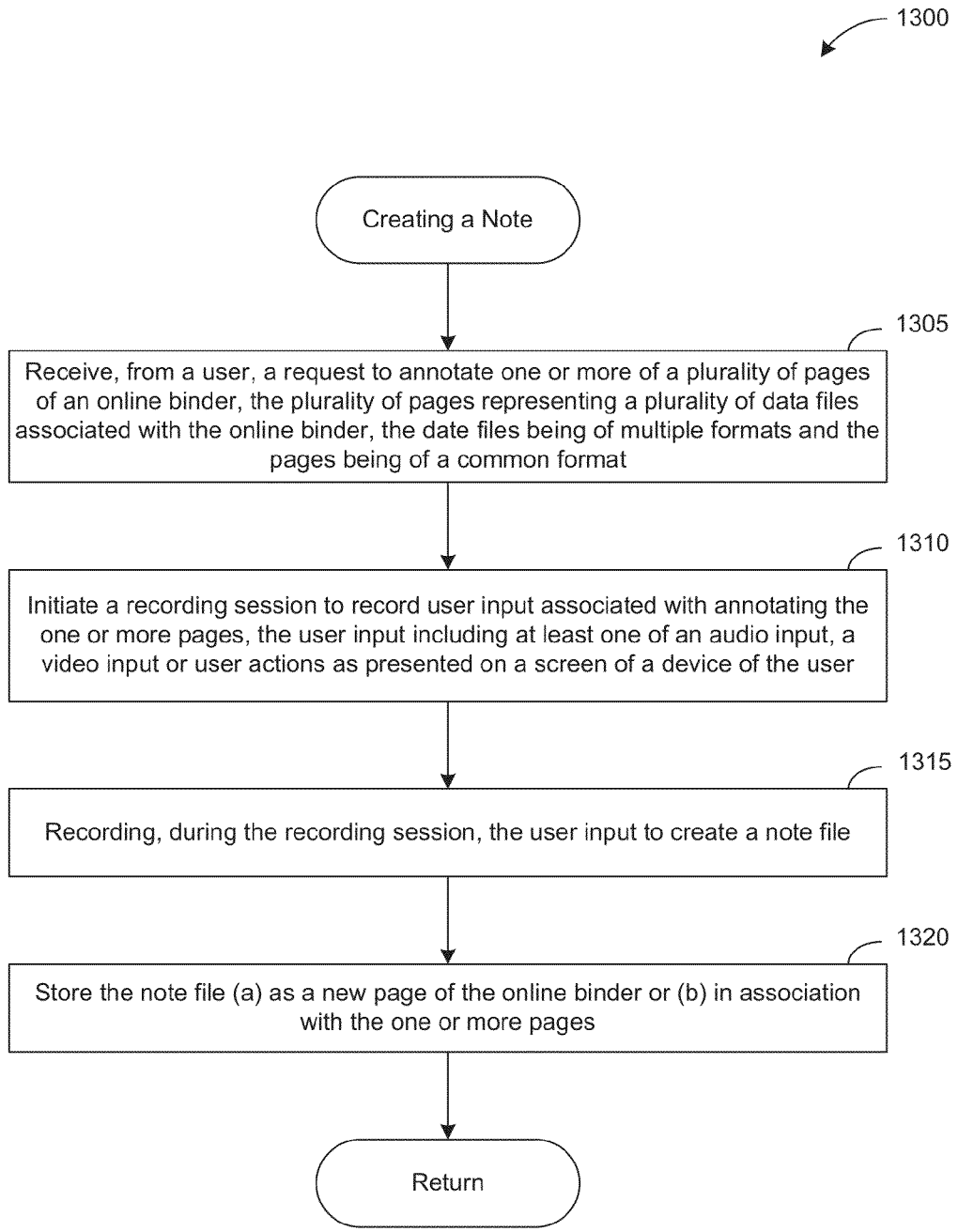
FIG. 13 is a flow diagram of a process of creating a note for a page of an online binder, consistent with various embodiments.

FIG. 13 is a flow diagram of a process of creating a note for a page of an online binder, consistent with various embodiments. In some embodiments, the process 1300 may be executed in a system such as system 1100 of FIG. 11. At block 1305, the annotation module 1130 receives a request to annotate one or more pages of an online binder from a user. At block 1310, the note recording module 1145 initiates a recording session to record user input associated with annotating the one or more pages. In various embodiments, the user input includes at least one of an audio input, a video input or user actions as presented on a screen of a device of the user. At block 1315, the note recording module 1145 records the user input received during the recording session to create a note. At block 1320, the note storing module 1150 stores the note file as a new page of the online binder or in association with the one or more pages.

Figure 14:
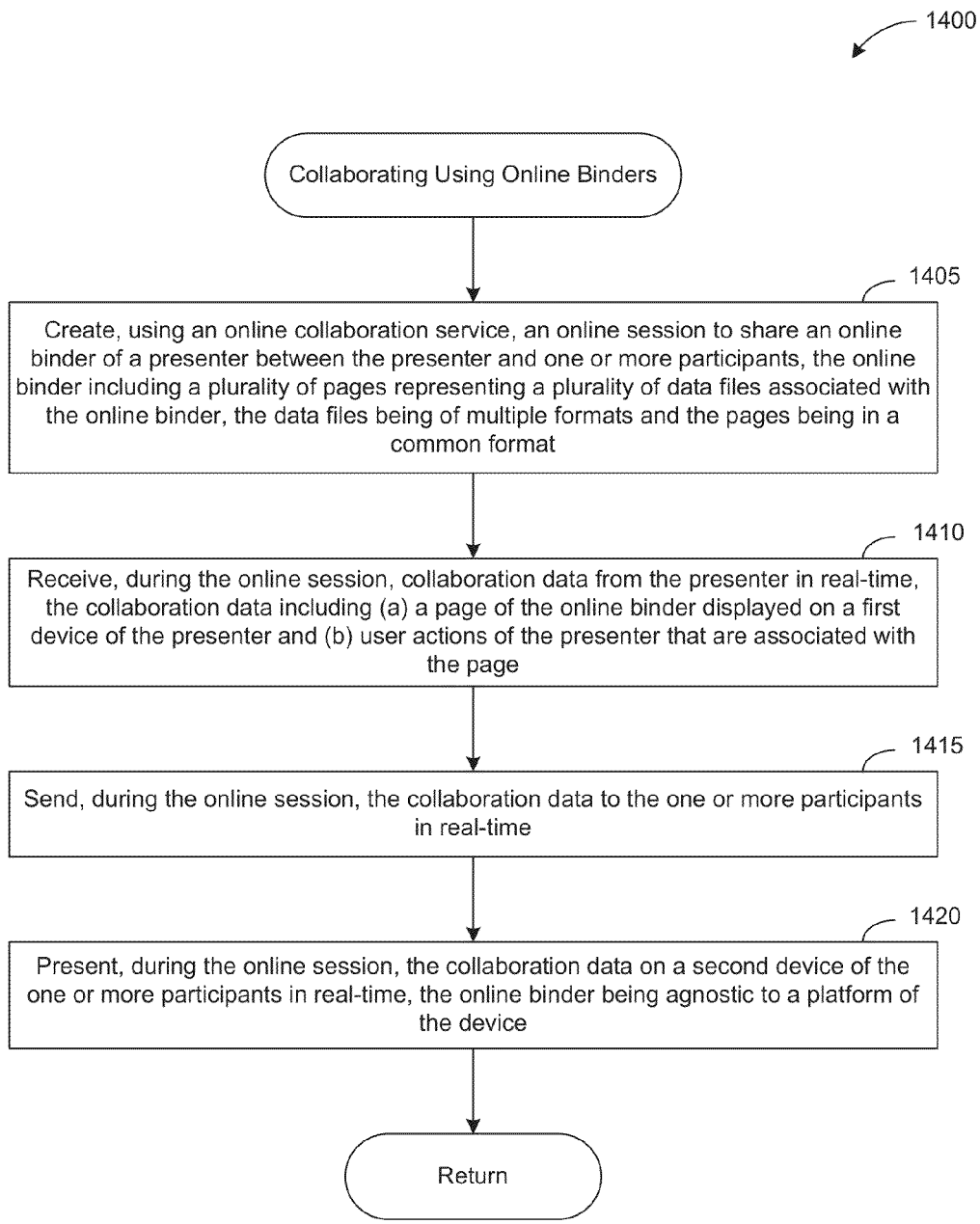
FIG. 14 is a flow diagram of a process of real-time collaboration on an online binder, consistent with various embodiments.

FIG. 14 is a flow diagram of a process 1400 of real-time collaboration on an online binder, consistent with various embodiments. In some embodiments, the process 1400 may be executed in a system such as system 1100 of FIG. 11. At block 1405, the online session creation module 1135 creates an online session to share an online binder of a presenter between the presenter and one or more participants. In various embodiments, a session is a semi-permanent interactive information interchange, also known as a dialogue, a conversation or a meeting, between two or more communicating devices, or between a computer and a user. An established communication session may involve more than one message (or data transfer) in each direction. In various embodiments, the online session for the real-time meeting may start when there is at least one participant present in the real-time meeting in addition to the presenter.

At block 1410, the online binder presenting module 1170 receives collaboration data including (a) a page of the online binder as displayed on a device of the presenter and (b) user actions of the presenter that are associated with the page. At block 1415, the online binder presenting module 1170 sends the collaboration data to the one or more participants in real-time. At block 1420, the online binder presenting module 1170 presents the collaboration data including the page of the online binder and the user actions of the presenter on a second device of the one or more participants.

It should be noted that the methods associated with blocks 1410-1420 are performed during the online session such as the online session created at block 1405 and in real-time.

Example Scenarios where Online Binders can be Used
Accounts Payable Management.

The online binder suite can be used in various industry verticals as a mechanism to collect, organize and approve invoices. Consider, for example, a restaurant chain. A restaurant manager takes images of each incoming vendor invoice, which are automatically stored and organized into a designated binder. The invoice binder is shared with the owner of the restaurant. The owner opens the invoice binder and approves the invoices for payment. In various embodiments, the owner can approve the invoices using a digital signature feature provided by the online binder suite. The invoice binder can also be shared with a remote bookkeeper. The bookkeeper can refer to the invoices in the binder and complete entries into the restaurant's accounting application. The bookkeeper can also sign off on each invoice entry, for example, using the digital signature feature.

Sales Collaboration

The online binder suite can be used as a centralized repository for creating storing, and sharing presentation materials. Consider, for example, a scenario in which a corporation has a number of salespersons distributed around the world who need access to corporate-approved presentation material. A sales administrator can create a sales binder and add sales presentation materials such as documents, videos, and audio clips to the sales binder. The sales administrator can share the sales binder with appropriate salespersons. As subscribers to the sales binder, each salesperson can instantly have access to the corporate-approved presentation material. The salespersons can, in turn, invite customers as view-only participants. Additionally, the salesperons can present the presentation materials in the sales binder to a customer remotely using, for example, the real-time meeting of the online binder suite.

Consumer Photo Sharing

The online binder suite can be used to share multimedia content such as photos, videos, audio clips with users. Consider, for example, a scenario where a family goes on a camping trip. Each family member takes photos and videos during the trip. Using the online binder suite, each of the family members can store the trip photos, videos and other content in an online binder that is shared with each of them. The family members can access the online binder and annotate the photos using drawings, captions, notes and record voice on a single photo or multiple photos. Further, they can share the annotated photos with other members of the family and/or even invite friends.

Remote Desktop Access from Mobile Device

The online binder suite can be used for remote collaboration between users. Consider, for example, a scenario where an executive is away from the office but needs access to a document such as a Microsoft Powerpoint file on his/her desktop. Using the online binder suite, the executive can, from his/her mobile device such as an Apple iPad, access the document of the desktop. For example, the executive can select the "Remote Desktop" feature from the online binder app installed on the mobile device. The executive is presented with a list of remote computers that have been previously set up as available resources. When the executive selects the particular remote computer, he/she is presented with list of files on that remote computer.

Figure 15:
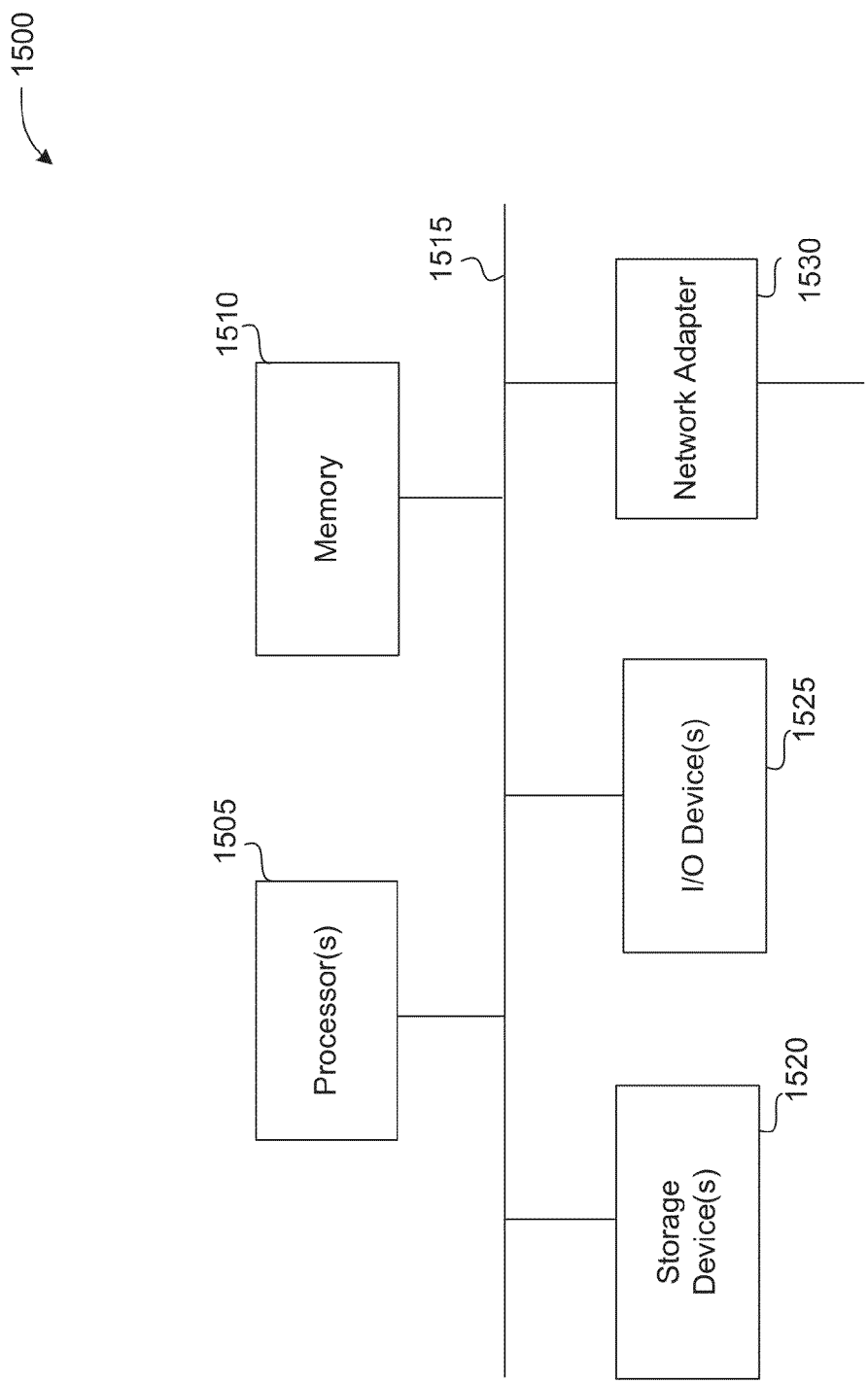
FIG. 15 is a block diagram illustrating components of an apparatus that may perform various operations described by the technology.

FIG. 15 is a block diagram of a computer system as may be used to implement features of some embodiments of the disclosed technology. The computing system 1500 may include one or more central processing units ("processors") 1505, memory 1510, input/output devices 1525 (e.g., keyboard and pointing devices, display devices), storage devices 1520 (e.g., disk drives), and network adapters 1530 (e.g., network interfaces) that are connected to an interconnect 1515. The interconnect 1515 is illustrated as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1510 and storage devices 1520 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1510 can be implemented as software and/or firmware to program the processor(s) 1505 to carry out actions described above. In some embodiments, such software or firmware may be initially provided to the processing system 1500 by downloading it from a remote system through the computing system 1500 (e.g., via network adapter 1530).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
    creating, by an online collaboration service executing on a computer system, an online session to share an online binder associated with a presenter between the presenter and one or more participants, the online binder including a plurality of pages representing a plurality of data files associated with the online binder, the data files being of multiple formats and the pages being in a common format;
    receiving, at the online collaboration service and during the online session, collaboration data from the presenter in real-time, the collaboration data including (a) a page of the online binder displayed on a first device of the presenter and (b) user actions of the presenter that are associated with the page;
    presenting, during the online session and in real-time, the collaboration data on a second device of the one or more participants, the online binder being agnostic to a platform of the first device or the second device;
    recording, at the online collaboration service, the online session between the presenter and the one or more participants; and
    storing, at the online collaboration service, the recording of the online session as a new page of the online binder associated with the presenter.

2. The method of claim 1 wherein presenting the collaboration data to the one or more participants includes:
    sending, by the online collaboration service and during the online session, the collaboration data to the second device of the one or more participants in real-time.

3. The method of claim 1, wherein the plurality of data files are received from a plurality of sources, and wherein the plurality of data files received in the multiple formats are converted to the common format of a page of the online binder.

4. The method of claim 1, wherein presenting the collaboration data including the user actions of the presenter includes presenting at least one of audio or visual user actions of the presenter, the at least one of audio or visual user actions associated with the page presented on the first device of the presenter.

5. The method of claim 1, wherein creating an online session to share an online binder of a presenter between the presenter and one or more participants includes configuring the online collaboration service to enable the presenter to send an invitation to the one or more participants to join the online session.

6. The method of claim 5, wherein sending the invitation to the one or more participants includes sending the invitation via at least one of (a) an email, (b) a text message to a telephone capable of receiving a text message, (c) a first notification through an application associated with the online collaboration service installed on the second device of the one or more participants, or (d) a second notification through a social network.

7. The method of claim 1, wherein creating an online session to share an online binder of a presenter between the presenter and one or more participants includes configuring the online collaboration service to enable the one or more participants to send a request to join the online session to the presenter.

8. The method of claim 1 further comprising:
presenting a list of online sessions in progress to the one or more participants.

9. The method of claim 1, wherein the online session and the online binder are accessible by the one or more participants via at least one of (a) a web browser application on the second device or (b) an online binder application installed on the second device.

10. The method of claim 1 further comprising:
playing, in response to accessing of the page corresponding to the recording by the presenter or the one or more participants, the recording of the online session at the first device or the second device.

11. The method of claim 1 further comprising:
tracking, at the online collaboration service, transactional data corresponding to a particular page, the transactional data including at least one of a username of a user who modified the particular page, a date, or a time when the modification is made.

12. The method of claim 1, wherein presenting the collaboration data including the page of the online binder to the one or more participants includes providing, in response to an acceptance of a request from a selected one of the one or more participants by the presenter, presenter rights to the selected one of the one or more participants.

13. The method of claim 1, wherein the data files are multi-media content including at least one of an audio, a video, a still image, or a text.

14. The method of claim 13, wherein the multiple formats of the data files include at least two of (a) Microsoft Word files, (b) Microsoft Excel files, (c) Microsoft PowerPoint files, (d) JPG files, (e) PDF files, (f) MOV files, (g) Keynotes files, (h) GIF files, (i) BMP files, or (j) TXT files .

15. The method of claim 1, wherein the data files in multiple formats are converted to the common format of the pages, the common format allowing the pages to be accessed via at least one of (a) a web browser application or (b) an application associated with the online binder.

16. A system comprising:
a processor;
an online session creation logic that is configured to create an online session to share an online binder between a presenter and one or more participants, the online binder including a plurality of pages representing a plurality of data files associated with the online binder, the data files being of multiple formats and the pages being in a common format;
an online binder presenting logic that is configured to present, during the online session, (a) a page of the online binder as displayed on a first device of the presenter and (b) user actions of the presenter associated with the page on a second device of the one or more participants in real-time, wherein the online binder is agnostic to a platform of the first device or the second device; and
an online session recording logic that is configured to record the online session between the presenter and the one or more participants and store the recording of the online session as a new page of the online binder.

17. A non-transitory computer-readable medium storing program instructions that, when executed by a processor, causes the processor to perform the method of:
creating, by an online collaboration service, an online session to share an online binder associated with a presenter between the presenter and one or more participants, the online binder including a plurality of pages representing a plurality of data files associated with the online binder, the data files being of multiple formats and the pages being in a common format;
presenting, during the online session, (a) a page of the online binder as displayed on a first device of the presenter and (b) user actions of the presenter that are associated with the page on a second device of the one or more participants in real-time, the online binder being agnostic to a platform of the device;
recording the online session between the presenter and the one or more Participants; and
storing the recording of the online session as a new page of the online binder.

\* \* \* \* \*